United States Patent
Saito

(10) Patent No.: US 9,055,711 B2
(45) Date of Patent: Jun. 9, 2015

(54) SYSTEM AND METHOD FOR MAINTAINING DATA INTEGRITY ON A STORAGE MEDIUM

(75) Inventor: Takahiro Saito, Kanagawa (JP)

(73) Assignee: HGST NETHERLANDS B.V., Amsterdam (NL)

( * ) Notice: Subject to any disclaimer, the term of this patent is extended or adjusted under 35 U.S.C. 154(b) by 214 days.

(21) Appl. No.: 13/550,149

(22) Filed: Jul. 16, 2012

(65) Prior Publication Data

US 2014/0019812 A1 Jan. 16, 2014

(51) Int. Cl.
*G06F 11/00* (2006.01)
*G06F 11/34* (2006.01)

(52) U.S. Cl.
CPC .......... *H05K 999/99* (2013.01); *G06F 11/3409* (2013.01)

(58) Field of Classification Search
CPC .............. H05K 999/99; G06F 11/3409; G06F 11/3495; G06F 11/3055; G06F 11/0748
USPC ........................................................ 714/47.3
See application file for complete search history.

(56) References Cited

U.S. PATENT DOCUMENTS

| | | | |
|---|---|---|---|
| 5,031,168 A | 7/1991 | Moore | |
| 5,367,652 A | 11/1994 | Golden et al. | |
| 5,600,500 A | 2/1997 | Madsen et al. | |
| 5,655,074 A * | 8/1997 | Rauscher | 714/38.1 |
| 5,901,003 A | 5/1999 | Chainer et al. | |
| 5,991,115 A | 11/1999 | Chainer et al. | |
| 6,262,857 B1 | 7/2001 | Hull et al. | |
| 6,320,718 B1 | 11/2001 | Bouwkamp et al. | |
| 6,826,140 B2 | 11/2004 | Brommer et al. | |
| 6,940,774 B2 * | 9/2005 | Perner | 365/222 |
| 7,020,808 B2 * | 3/2006 | Sato et al. | 714/47.3 |
| 7,062,685 B1 * | 6/2006 | Plofsky et al. | 714/47.3 |
| 7,253,986 B2 | 8/2007 | Berman et al. | |
| 7,369,339 B2 * | 5/2008 | Kojima et al. | 360/31 |
| 7,428,120 B2 | 9/2008 | Berman et al. | |
| 7,463,441 B2 | 12/2008 | Cho et al. | |
| 7,692,994 B2 * | 4/2010 | Pyeon | 365/222 |
| 7,733,589 B2 | 6/2010 | Wada et al. | |
| 7,742,356 B2 * | 6/2010 | Dono et al. | 365/222 |
| 7,747,907 B2 | 6/2010 | Olds et al. | |
| 7,920,352 B2 | 4/2011 | Inoue et al. | |
| 8,014,097 B1 | 9/2011 | Sanvido | |
| 8,190,837 B2 | 5/2012 | McLeod et al. | |
| 8,316,263 B1 * | 11/2012 | Gough et al. | 714/47.3 |
| 8,705,307 B2 * | 4/2014 | Henderson et al. | 365/222 |
| 8,806,117 B2 * | 8/2014 | Islam et al. | 711/106 |
| 2003/0133217 A1 | 7/2003 | Nunnelley | |
| 2005/0193250 A1 * | 9/2005 | Takeuchi et al. | 714/15 |
| 2005/0264930 A1 | 12/2005 | Gider et al. | |
| 2007/0286005 A1 * | 12/2007 | Pyeon | 365/222 |
| 2008/0130394 A1 * | 6/2008 | Dono et al. | 365/222 |
| 2008/0256397 A1 * | 10/2008 | Smith | 714/47 |
| 2009/0290245 A1 | 11/2009 | Motoki | |
| 2010/0149681 A1 | 6/2010 | Masuyama | |

(Continued)

FOREIGN PATENT DOCUMENTS

WO 2012058478 A1 5/2012

*Primary Examiner* — Amine Riad

(57) ABSTRACT

A method of storing data on a storage medium includes determining a risk index associated with a performance of the storage medium, adjusting a refresh factor associated with at least a portion of the storage medium in response to determining the risk index, and performing a data refresh operation on the portion of the storage medium based at least in part on the on the refresh factor.

21 Claims, 4 Drawing Sheets

(56) References Cited

U.S. PATENT DOCUMENTS

| | | | |
|---|---|---|---|
| 2010/0251039 A1* | 9/2010 | Hirohata et al. | 714/704 |
| 2011/0047322 A1* | 2/2011 | Allen et al. | 711/103 |
| 2011/0075290 A1 | 3/2011 | Hobbet | |
| 2011/0162073 A1* | 6/2011 | Jeschke et al. | 726/25 |
| 2011/0271032 A1* | 11/2011 | Yamada et al. | 711/102 |
| 2012/0014013 A1 | 1/2012 | Bandic et al. | |
| 2012/0151131 A1* | 6/2012 | Kilmer et al. | 711/106 |
| 2013/0013964 A1* | 1/2013 | Hirohata et al. | 714/47.3 |
| 2013/0027800 A1 | 1/2013 | Park et al. | |
| 2013/0085917 A1* | 4/2013 | Agarwal et al. | 705/35 |
| 2013/0253979 A1* | 9/2013 | Williams et al. | 705/7.28 |
| 2014/0156923 A1* | 6/2014 | Bains et al. | 711/106 |
| 2014/0281202 A1* | 9/2014 | Hunter et al. | 711/106 |

* cited by examiner

| TRACK  | -32~-17 | -16~-11 | -10~-3 | -2 | -1 | 0 | 1  | 2  | 3~10 | 11~16 | 17~32 |
|--------|---------|---------|--------|----|----|---|----|----|------|-------|-------|
| FACTOR | 1       | 1       | 6      | 12 | 32 | 2 | 32 | 12 | 6    | 1     | 1     |

*FIG. 4*

| TRACK  | -32~-17 | -16~-11 | -10~-3 | -2 | -1 | 0 | 1  | 2  | 3~10 | 11~16 | 17~32 |
|--------|---------|---------|--------|----|----|---|----|----|------|-------|-------|
| FACTOR | 2       | 2       | 12     | 18 | 48 | 2 | 48 | 18 | 12   | 2     | 2     |

*FIG. 6*

| TRACK  | -32~-17 | -16~-11 | -10~-3 | -2 | -1 | 0 | 1  | 2 | 3~10 | 11~16 | 17~32 |
|--------|---------|---------|--------|----|----|---|----|---|------|-------|-------|
| FACTOR | 1       | 1       | 2      | 6  | 16 | 1 | 16 | 6 | 2    | 1     | 1     |

*FIG. 7*

| TRACK  | -42~-33 | -32~-17 | -16~-11 | -10~-3 | -2 | -1 | 0 | 1  | 2  | 3~10 | 11~16 | 17~32 | 33~42 |
|--------|---------|---------|---------|--------|----|----|---|----|----|------|-------|-------|-------|
| FACTOR | 1       | 2       | 2       | 12     | 18 | 48 | 2 | 48 | 18 | 12   | 2     | 2     | 1     |

*FIG. 8*

SYSTEM AND METHOD FOR MAINTAINING DATA INTEGRITY ON A STORAGE MEDIUM

FIELD OF THE DISCLOSURE

This disclosure, in general, relates to systems and methods for maintaining data integrity on storage media, particularly disk drives.

BACKGROUND

Over many decades, storage device manufacturers have been under pressure to increase storage capacity and decrease the size of storage devices. In the disk drive industry, increased recording density has been accompanied by narrowing track pitch density (TPI). However, such TPI narrowing leads to errors caused by magnetic flux leaks.

When data is recorded on a particularly data track of a disk device, magnetic flux leaks from the recording and affects data integrity on adjacent data tracks and far data tracks. When the recorded data has been updated many times, data recorded on adjacent tracks or on far tracks can be corrupted and bit values stored on such tracks may not be recoverable using error recovery techniques, such as error correction codes (ECC). For adjacent tracks, such a phenomenon is known as adjacent track interference (ATI). For far tracks, such a phenomenon is known as far track erasure or far track interference (FTI). Depending on the write head design, both ATI and FTI effects occur during the writing of data tracks.

Such ATI or FTI effects can be influenced by manufacturing tolerances for write heads and magnetic media. In particular, the arcuate movement of a write head and armature and the geometries of the head and media may also alter the impact ATI or FTI has on stored data as the write head moves across the surface of the storage media.

Error correction techniques can be utilized to correct for soft read errors. Soft read errors are those errors that are recoverable by error correction techniques, such as ECC. However, data encoding and ECC are limited in the number of bit errors that can be corrected by hard drive electronics. When there are too many bit errors, data bits may not be recovered and as such the data block is considered unrecoverable. In particular, when the ATI/FTI degradation is too far along in the data block, the data track may be unrecoverable.

As such, an improved method of data storage would be desired.

SUMMARY

In a first aspect, a method of storing data on a storage medium includes determining a risk index associated with a performance of the storage medium, adjusting a refresh factor associated with at least a portion of the storage medium in response to determining the risk index, and performing a data refresh operation on the portion of the storage medium based at least in part on the on the refresh factor.

In a second aspect, a computer readable non-transitory storage medium comprises a plurality of instructions to manipulate a processor. The plurality of instructions include instructions for determining a risk index associated with a performance of the storage medium, instructions for adjusting a refresh factor associated with at least a portion of the storage medium in response to determining the risk index, and instructions for performing a data refresh operation on the portion of the storage medium based at least in part on the on the refresh factor.

In a third aspect, an apparatus includes a processor, a storage medium in communication with the processor, and a memory in communication with the processor. The memory is to store instructions to manipulate the processor. The instructions include instructions for determining a risk index associated with a performance of the storage medium, instructions for adjusting a refresh factor associated with at least a portion of the storage medium in response to determining the risk index, and instructions for performing a data refresh operation on the portion of the storage medium based at least in part on the on the refresh factor.

BRIEF DESCRIPTION OF THE DRAWINGS

The present disclosure may be better understood, and its numerous features and advantages made apparent to those skilled in the art by referencing the accompanying drawings.

FIG. 4 includes an illustration of an exemplary risk multiplier table.

FIG. 6, FIG. 7, and FIG. 8 include illustrations of exemplary adjusted risk multiplier tables.

The use of the same reference symbols in different drawings indicates similar or identical items.

DESCRIPTION OF THE PREFERRED EMBODIMENT(S)

In an exemplary embodiment, a method for storing data on a storage medium includes periodically refreshing data within a portion of the storage medium by reading the data, optionally correcting the data, and writing the corrected data to the portion of storage medium. In a particular example, operation of the storage medium yields risk indices indicative of a risk that data can become corrupted or can become unrecoverable. In response to such risk indices, a refresh factor is updated. The refresh factor is associated with how frequently a refresh operation is performed. Such a refresh factor can be associated with the storage medium as a whole or can be associated with a portion of the storage medium. The refresh factor can be updated to either increase the frequency at which a refresh occurs or can be updated to decrease the frequency at which a refresh occurs. In such a manner, a storage medium operating with a low risk of introducing errors is provided with an enhanced performance, while a storage medium with high risk or the storage medium as it ages, maintains data integrity through increased frequency of refresh operations.

Figure 1:
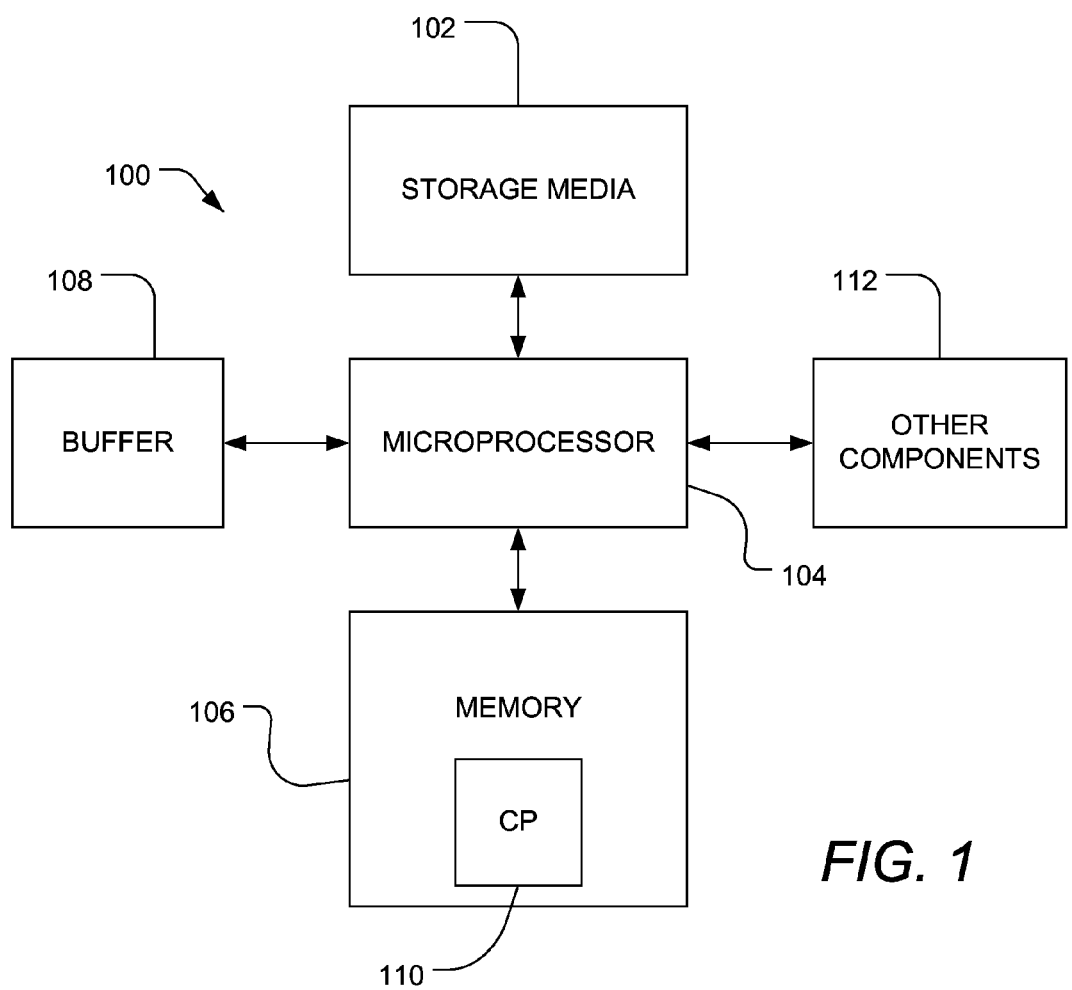
FIG. 1 includes an illustration of an exemplary system for storing data.

FIG. 1 shows a hard disk drive (HDD) 100 including a recording disk or HD 102, a microprocessor 104, a memory 106, and a buffer 108. The microprocessor 104 is in communication with the HD 102, with the memory 106, with the buffer 108, and with other components of the hard disk drive 100. In an embodiment, the HD 102 can be a patterned magnetic HD, such that each bit of data stored on the HD can be located on a separate island preferably not magnetically connected to the neighboring bit island. Such patterned media is also referred to as bit pattern media (BPM). The HD 102 can be preferably divided into sectors of data cylindrically arranged around the HD. In another embodiment, the HD 102 can be a discrete-tract media storage device, such that the bit islands are preferably separate discrete locations on the HD, but the separate locations can be magnetically coupled together. In another embodiment, the HD 102 can include a magnetic disk that is divided into different continuous magnetic regions, such that each of the different magnetic regions represents a different bit. In another embodiment, the HD 102 can be an optical disk.

In an embodiment, the memory 106 can be a computer readable medium, such as a non-transitory memory and the memory can include a computer program 110 including instructions for the microprocessor 104, such as instructions for processing the data stored on the HD 102. During a data writing process, the microprocessor 104 preferably utilizes the instructions of the computer program 110 to write the data to the HD 102. In an embodiment, the HD 102 can include a plurality of sectors of data, and each sector can be 512B of data. Additionally, each sector can have parity bits/symbols added to it, such that the parity bits/symbols protect the data against errors through an ECC.

An exemplary error correction code (ECC) used in magnetic recording is a Reed-Solomon (RS) code. A RS code is based on symbols of a certain size, such as 8-bit symbols (bytes) or 10-bit symbols. The parity-symbols in a RS code are obtained as the remainder of dividing the information symbols by a generating polynomial g(x). In an embodiment, a RS code ECC having 10-bit symbols can require 16 parity symbols to correct 8 symbols per sector. A generator polynomial for the RS code would be g0(x)=(x−a)(x−a2) . . . (x−a16), where 'a' is a primitive element of GF(210) (see McWilliams and Sloane, The Theory of Error-Correcting Codes). However, for the RS code to correct 16 symbols per sector, the data can be further encoded together with additional parity-symbols using the polynomial g1(x)=(x−a17)(x−a18) . . . (x−a32). The RS code can use an additional 16 parity-symbols that can be stored in a region of the HD 102. In an embodiment, based on a nested property of RS codes, the product g0(x) g1(x) gives a RS generator polynomial for a code that can be capable of correcting up to 16 symbol errors per sector. The decoding of the RS codes to recover the user-bits can be made either by hard decoding methods, such as the Berlekamp-Massey decoding algorithm, or by soft decoding methods, such as the Koetter-Vardy (based on the Guruswami-Sudan) decoding algorithm.

In another embodiment, the ECC can be implemented using other codes that are not RS codes, such as Low Density Parity-Check (LDPC) codes together with soft decoding. In another embodiment, the ECC can alternate RS codes with LDPC codes. In this embodiment, the RS code can be an "inner" code and the LDPC code an "outer" code, or conversely. For example, the data can be first encoded into an outer code, such as a RS code. Then the data together with the RS parity symbols can be further encoded using another code, such as an LDPC code. The second code used to encode the data can be called inner code. At the decoding, these operations are reversed, such that the data can be soft decoded using the LDPC iterative decoder. Then the data can be decoded by applying the decoding algorithm for the RS code.

In a particular example, the microprocessor 104 operates to monitor a risk index and update payroll refresh factor based at least in part on the risk index. Based at least in part on the updated refresh factor, the processor 104 can direct the refresh of a portion of a storage medium. In particular, a refresh of a portion of the storage medium includes reading the portion of the storage medium, optionally correcting the read data, and writing the corrected data to the portion of storage medium. In an example, the portion of the storage medium is a track, such as a track of a disk drive.

Figure 2:
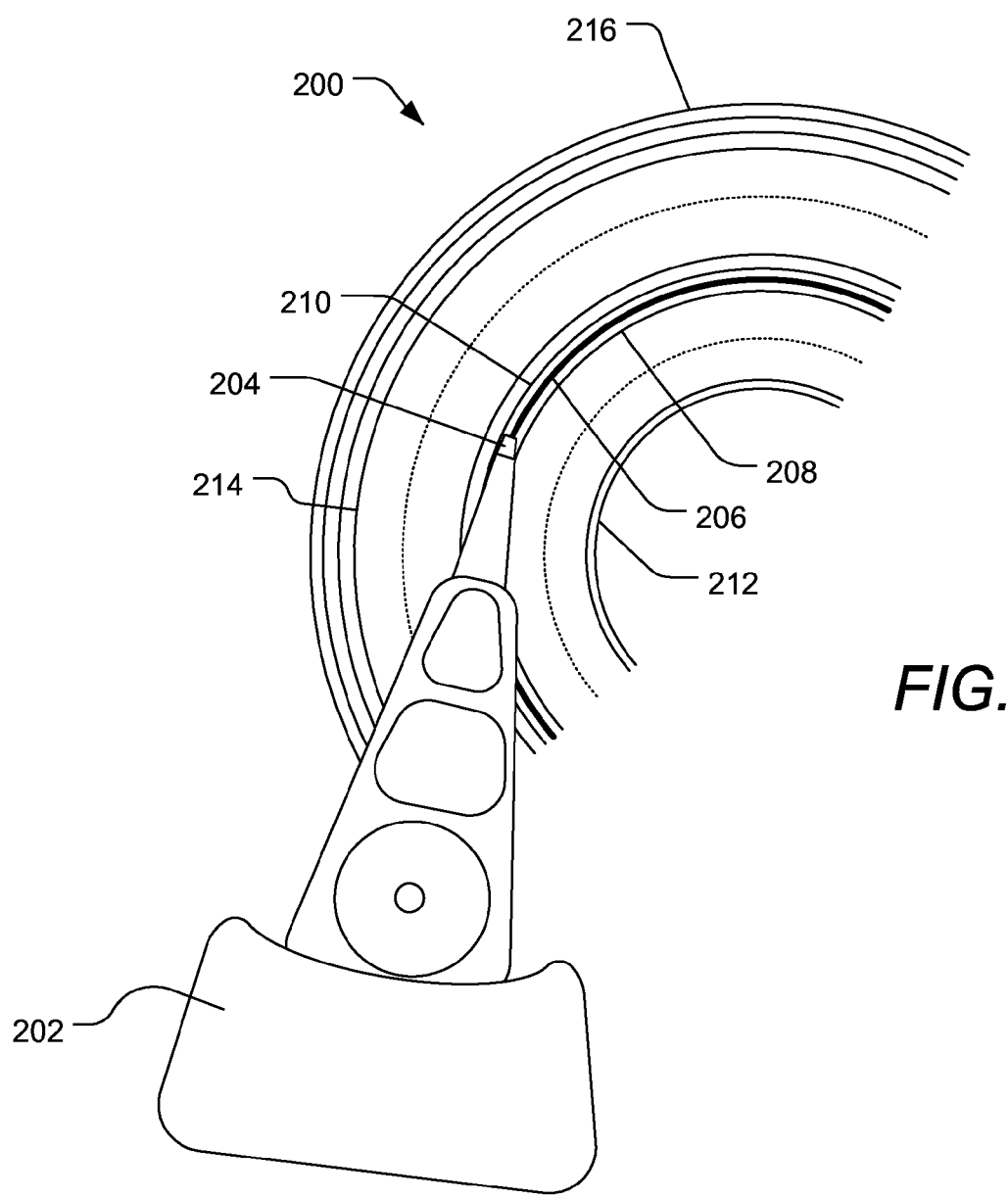
FIG. 2 includes an illustration of an exemplary disk media.

For example, as illustrated in FIG. 2, a magnetic disk drive 200 includes a recording medium 216 and an armature 202 having a write head 204 positionable to write data to a track on the spinning recording medium 216. In the illustrated example, when the write head 204 writes data to a track 206, the data stored on an inner adjacent track 208 or on an outer adjacent track 210 can be affected by the write operation to the track 206. In addition, tracks that are not adjacent to the track 206, such inner far track 212 or outer far track 214, can be affected by the write operation, generally to a lesser extent than the effect on adjacent tracks. Such effects can also be related to the movement of the armature 202, moving the write head 204 in position in proximity to the track 206. As such, even the data in the track medium of inner far track 212 or outer far track 214 can be affected during the write operation to track 206. Accordingly, the manufacturing tolerances for the write head and magnetic media, the arcuate movement and geometry of the write-head and the medium, the temperature, and age influences the performance of a storage medium, which in turn influences a risk index that leads to updating a refresh factor. Based at least in part on the refresh factor, a refresh of portions of the storage medium is performed.

Figure 3:
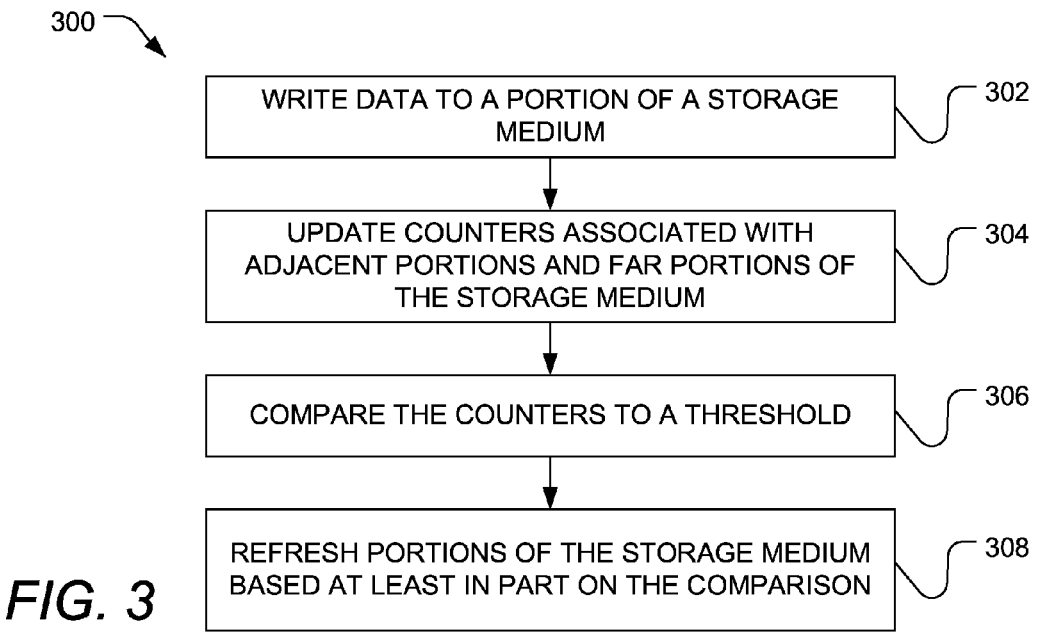
FIG. 3 includes a block flow diagram illustrating an exemplary method for storing data.

For example, as illustrated in FIG. 3, a method 300 for storing data on a storage medium includes periodically refreshing portions of the storage medium. For example, as illustrated at 302, data is written to the portion of the storage medium. In a particular example, data can be written to a particular track of the storage medium.

As illustrated at 304, counters associated with portions of the storage medium, such as adjacent portions and far portions of the storage media, can be updated. For example, each track of a disk storage medium can be associated with a counter. When a track is written, the counter associated with the track and counters associated with adjacent and far tracks can be adjusted. In an example, each track counter can be increased by the same number. Alternatively, each track counter is updated by a factor associated with its position relative to the track to which data is written.

For example, the system can include a risk multiplier table, such as the risk multiplier table illustrated in FIG. 4. The risk multiplier table includes factors to be applied to the counters of a track based on its position relative to the written track. For example, as illustrated in FIG. 4, the counter of the track being written is increased by a factor (labeled 0) in response to writing the track. The counter of the nearest adjacent tracks, denoted 1 and −1, are updated by a factor significantly greater than factor associated with the written track. For example, the counter associated with tracks adjacent to the written track can be increased by 32. With increased distance from the track being written, the factor by which the counter of the associated track is updated decreases with relative distance. As illustrated in FIG. 4, the tracks immediately adjacent as denoted by −1 and 1 are greater than the factors associated with the tracks one track removed from the written track as indicated by the factors associated with track denoted −2 and 2. In particular, the −2 and 2 tracks are updated by a factor of 12, for examples, because tracks further from the written track can be less affected by the write operation. Alternatively, the factors can be the same.

While the risk multipliers are illustrated as being symmetric relative to the position of the track (track 0) to be written, the risk multipliers can be distributed asymmetrically for example, inner tracks can have a lower risk relative to outer tracks based on system geometries. In another example, risk factors can be applied to a fewer number of tracks in an inner position relative to the track being written than outer tracks relative to the tracking written. Alternatively, other geometries can result in greater risk for inner tracks.

Returning to FIG. 3, as the counters associated with the tracks around the track to which data is being written are updated, the counters can be compared to a threshold, as illustrated at 306. For example, the counters can be compared to a refresh threshold. When the counters exceed the refresh threshold, a refresh operation can be performed. As such, portions of the storage medium are refreshed based at least in part on the comparison of the counters to the refresh threshold, as illustrated at 308. In particular, the refresh operation can include reading data from the particular portion of the storage medium, such as a track, and correcting errors within the read data using error correction techniques, such as checksums and error correction codes. The corrected data can be rewritten to the portion of the storage medium and the counter associated with the portion of storage medium can be reset, such as to 0 or a low number.

Figure 5:
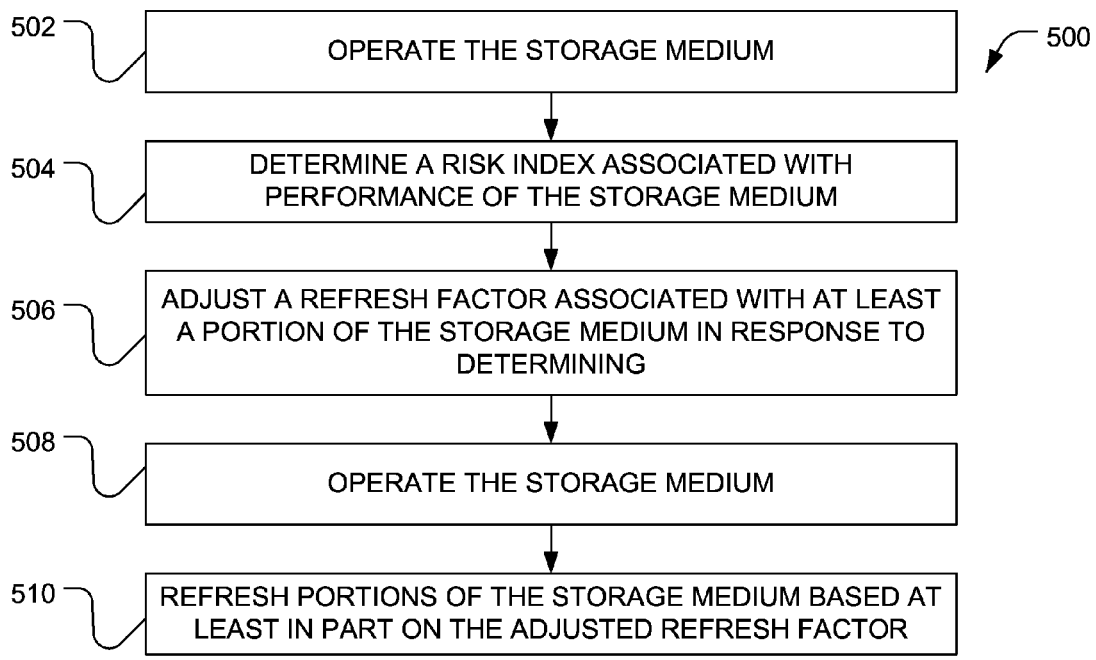
FIG. 5 includes a block flow diagram illustrating an exemplary method for storing data.

FIG. 5 includes another example of an exemplary method for storing data to storage medium. The method 500 includes operating the storage medium, as illustrated at 502. In particular, operating the storage medium includes writing data to the storage medium, reading data from the storage medium, and optionally correcting the read data. During operation of the storage medium, various parameters can be determined, indicating performance of the storage medium. For example, soft read errors can be detected, a soft error rate can be determined, a signal-to-noise ratio of a read channel can be measured, an average number of bits in error for a track can be determined, time or number of reads since a last detected error can be determined, or other parameters associated with the performance of the storage medium can be measured.

As illustrated at 504, a risk index associated with the performance of the storage medium can be determined. Such a risk index can be directly or indirectly associated with the performance parameters associated with the storage medium. In particular, the risk index can be determined formulaically based on the numeric value of one or more performance parameters. In an example, the risk index can have the value of the performance parameter. In another example, the risk index can be a Boolean variable or a tri-state variable having values that indicate low risk, medium risk, or high risk. In particular, the risk index can be determined by comparing a performance parameter to one or more thresholds, such as a low risk threshold and a high risk threshold. For example, the risk index can be determined based on whether a soft error rate is above or below a risk threshold. In a particular example, when the soft error rate is above a high risk threshold, the value of the risk index can indicate high risk. In a further example, when the soft error rate is below a low risk threshold, the value of the risk index can indicate low risk. When the soft error rate is between a low risk threshold and a high risk threshold, the value of the risk index can indicate medium risk. In another example, the risk index can be determined based on whether an average number of bits in error for a data track is above or below a threshold. In a further example, the risk index can be determined based on the signal-to-noise ratio of the read channel. In a further example, a risk index can be determined based on the performance of error recovery protocols. In particular, the risk index can be determined based at least in part on a read channel statistic relative to iterative decoding. Moreover, one or more risk indicies can be determined based on one or more performance parameters.

Based at least in part on the risk index, the refresh factor associated with at least a portion of the storage medium can be adjusted. The risk factor can be associated with a single track, a set of tracks, or the storage medium as a whole. In particular, the risk factor can be a risk multiplier table, a counter associated with one or more tracks, or a risk threshold. For example, in response to the risk index, a risk multiplier table can be adjusted. In particular, the factors (e.g., multipliers) within the risk multiplier table can be adjusted based at least in part on when the risk index indicates greater risk or lower risk of error within the system. For example, when the risk index (e.g., a Boolean index or a tri-state index) indicates a reduced level of risk, the factors of the risk multiplier table can be decreased to reduce the frequency or how often tracks are refreshed. When the risk index indicates greater risk, the factors within the risk multiplier table can be increased to facilitate more frequent refresh of portions of the storage medium. In another example, the refresh factor can be adjusted to facilitate less frequent refresh when the risk index is below a low risk threshold and can be adjusted to increase the frequency or how often tracks are refresh when the risk index is greater than a high risk threshold. In an example, the thresholds associated with the risk index can be the same threshold. Alternatively, risk indexes can be configured to indicate greater risk when the index has a lower value, and the thresholds and logic can be adjusted accordingly.

For example, as illustrated in FIG. 6, when a soft error rate exceeds a particular threshold, a risk index can indicate high risk, and the risk factors associated with tracks having positions relative to the track being written can be increased. For example, the multiplier or risk factors for tracks (−1, 1) are adjusted to have a higher value relative to the values of the risk multiplier table illustrated in FIG. 4. Such risk factors are illustrated as being increased at each position other than the write position. However, the risk factors can be increased for particular adjacent tracks and the distribution of risk multipliers can taper with relative distance from the written track. As will be understood, the nature of the adjustment can be changed to accommodate other refresh logic.

In another example, when the signal-to-noise ratio is below a threshold or the soft error rate is below a threshold, such as a low threshold, a risk index can indicate low risk, and the values of risk factors associated with adjacent tracks and far tracks can be reduced, yielding less frequent refresh of the associated tracks. For example, FIG. 7 illustrates an adjusted risk multiplier table having lower factors relative to the factors illustrated in FIG. 4.

In an alternative example, the number of adjacent and far tracks can be manipulated based on the risk index. For example, the soft error rate exceeds a particular threshold, factors can be applied to additional tracks. As illustrated in FIG. 8, factors are applied for tracks in the relative positions 33 through 44 in addition to an increase in the values of the risk factors for adjacent and far tracks. As such, the risk multiplier table of FIG. 8 applies risk multipliers to a greater number of tracks relative to the risk multiplier table illustrated in FIG. 4 and provides greater values associated with risk factors than does the risk multiplier table illustrated in FIG. 4.

Returning to FIG. 5, other refresh factors can be updated in addition to or alternatively to the risk multiplier table. For example, the refresh threshold to which the counter is compared can be increased or decreased based at least in part on the risk index. In an example, when the risk index indicates a greater risk of errors, the refresh threshold can be decreased, resulting in more frequent refresh of portions of the storage medium. In another example, when the risk index indicates a low risk for soft read errors, the refresh threshold can be increased, resulting in less frequent refresh operation. In an additional example, the counter can be increased or decreased based at least in part on the risk index. The counter can be increased or decreased using a fixed number or can be increased or decreased as a percentage of the counter. For example, the counter can be decreased in response to a low soft error rate. In another example, the counter can be increased by a set amount or by a multiplier. In a further example, when the risk index indicates low risk, the counter can be decreased by fixed amount or by a percentage or multiplier.

Using the adjusted refresh factor, the storage medium can be again operated, as illustrated at 508. For example, operations can include writing data to the storage medium, reading data from the storage medium, and correcting the read data. Performance parameters can be measured and the risk index and refresh factor updated as described above. In a particular example, each write operation results in an update of the counter value wherein the change in the counter value is dependent upon the adjusted refresh factor. For example, when the adjusted refresh factor includes an adjusted risk multiplier table, the amount by which a counter is updated depends on the adjusted values within the risk multiplier table. In such an example, when the counter reaches or exceeds a refresh threshold, a refresh operation is performed.

For example, as illustrated at 510, a refresh of the portion of storage medium is performed based at least in part on the adjusted refresh factor. In particular, the adjusted refresh factor influences the rate or how often a refresh of portions of the storage medium are performed. For example, the risk multiplier table having an increased value of the risk factors can result in more frequent refresh of portions of the storage medium. In another example, a decrease of a threshold associated with a counter can result in a more frequent refresh of the storage medium. In addition, lower values stored within the risk multiplier table or an increase in threshold can result in less frequent refresh of the portions of the storage medium.

In a first aspect, a method of storing data on a storage medium includes determining a risk index associated with a performance of the storage medium, adjusting a refresh factor associated with at least a portion of the storage medium in response to determining the risk index, and performing a data refresh operation on the portion of the storage medium based at least in part on the on the refresh factor.

In an example of the first aspect, the method further includes writing first data to a track after adjusting and adjusting a risk counter associated with an adjacent track based at least in part on the adjusted refresh factor.

In another example of the first aspect and the above examples, the method further includes writing second data to the track prior to adjusting the refresh factor and adjusting a risk counter associated with the adjacent track based at least in part on the refresh factor prior to adjusting.

In a further example of the first aspect and the above examples, adjusting the refresh factor includes changing a risk multiplier table associated with the at least a portion of the storage medium. For example, changing the risk multiplier includes adjusting the values of risk multipliers of the risk multiplier table. In an example, adjusting the values of the risk multipliers includes increasing the values of the risk multipliers of the risk multiplier table when the risk index indicates increased risk. In another example, adjusting the values of the risk multipliers includes decreasing the values of the risk multipliers of the risk multiplier table when the risk index indicates decreased risk. In an additional example, changing the risk multiplier includes adjusting the number of relative tracks associated with the risk multiplier table. In a particular example, adjusting the number of relative tracks includes decreasing the number of tracks relative to a written track for which risk multiplier values are stored in the risk multiplier table.

In an additional example of the first aspect and the above examples, adjusting the refresh factor includes changing a risk threshold associated with the at least a portion of the storage medium.

In another example of the first aspect and the above examples, changing the risk threshold includes increasing the risk threshold when the risk index indicates a decrease in risk. For example, changing the risk threshold includes decreasing the risk threshold when the risk index indicates an increase in risk.

In a further example of the first aspect and the above examples, adjusting the refresh factor includes changing a risk counter associated with the at least a portion of the storage medium. For example, the at least a portion of the storage medium is a track and the risk counter is associated with the track.

In an additional example of the first aspect and the above examples, determining the risk index includes determining the risk index based at least in part on a soft error rate.

In another example of the first aspect and the above examples, determining the risk index includes determining the risk index based at least in part on a signal-to-noise ratio.

In a further example of the first aspect and the above examples, determining the risk index includes determining the risk index based at least in part on performance of an error correction code.

In an additional example of the first aspect and the above examples, determining the risk index includes determining the risk index based at least in part on a retry rate.

In another example of the first aspect and the above examples, determining the risk index includes determining the risk index based at least in part on a read channel statistic relating to iterative decoding.

In a second aspect, a computer readable non-transitory storage medium comprises a plurality of instructions to manipulate a processor. The plurality of instructions include instructions for determining a risk index associated with a performance of the storage medium, instructions for adjusting a refresh factor associated with at least a portion of the storage medium in response to determining the risk index, and instructions for performing a data refresh operation on the portion of the storage medium based at least in part on the on the refresh factor.

In a third aspect, an apparatus includes a processor, a storage medium in communication with the processor, and a memory in communication with the processor. The memory is to store instructions to manipulate the processor. The instructions include instructions for determining a risk index associated with a performance of the storage medium, instructions for adjusting a refresh factor associated with at least a portion of the storage medium in response to determining the risk index, and instructions for performing a data refresh operation on the portion of the storage medium based at least in part on the on the refresh factor.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of storing data on a storage medium, the method comprising:
    determining a risk index associated with a performance of the storage medium;
    adjusting a refresh factor associated with at least a portion of the storage medium in response to determining the risk index; and
    performing a data refresh operation on the portion of the storage medium based at least in part on the on the refresh factor.

2. The method of claim 1, further comprising:
    writing first data to a track after adjusting; and
    adjusting a risk counter associated with an adjacent track based at least in part on the adjusted refresh factor.

3. The method of claim 2, further comprising:
    writing second data to the track prior to adjusting the refresh factor; and
    adjusting a risk counter associated with the adjacent track based at least in part on the refresh factor prior to adjusting.

4. The method of claim 1, wherein adjusting the refresh factor includes changing a risk multiplier table associated with the at least a portion of the storage medium.

5. The method of claim 4, wherein changing the risk multiplier includes adjusting the values of risk multipliers of the risk multiplier table.

6. The method of claim 5, wherein adjusting the values of the risk multipliers includes increasing the values of the risk multipliers of the risk multiplier table when the risk index indicates increased risk.

7. The method of claim 5, wherein adjusting the values of the risk multipliers includes decreasing the values of the risk multipliers of the risk multiplier table when the risk index indicates decreased risk.

8. The method of claim 4, wherein changing the risk multiplier includes adjusting the number of relative tracks associated with the risk multiplier table.

9. The method of claim 8, wherein adjusting the number of relative tracks includes decreasing the number of tracks relative to a written track for which risk multiplier values are stored in the risk multiplier table.

10. The method of claim 1, wherein adjusting the refresh factor includes changing a risk threshold associated with the at least a portion of the storage medium.

11. The method of claim 10, wherein changing the risk threshold includes increasing the risk threshold when the risk index indicates a decrease in risk.

12. The method of claim 10, wherein changing the risk threshold includes decreasing the risk threshold when the risk index indicates an increase in risk.

13. The method of claim 1, wherein adjusting the refresh factor includes changing a risk counter associated with the at least a portion of the storage medium.

14. The method of claim 13, wherein the at least a portion of the storage medium is a track and the risk counter is associated with the track.

15. The method of claim 1, wherein determining the risk index includes determining the risk index based at least in part on a soft error rate.

16. The method of claim 1, wherein determining the risk index includes determining the risk index based at least in part on a signal-to-noise ratio.

17. The method of claim 1, wherein determining the risk index includes determining the risk index based at least in part on performance of an error correction code.

18. The method of claim 1, wherein determining the risk index includes determining the risk index based at least in part on a retry rate.

19. The method of claim 1, wherein determining the risk index includes determining the risk index based at least in part on a read channel statistic relating to iterative decoding.

20. A computer readable non-transitory storage medium comprising a plurality of instructions to execute using a processor, the plurality of instructions comprising:
    instructions for determining a risk index associated with a performance of the storage medium;
    instructions for adjusting a refresh factor associated with at least a portion of the storage medium in response to determining the risk index; and
    instructions for performing a data refresh operation on the portion of the storage medium based at least in part on the on the refresh factor.

21. An apparatus comprising:
    a processor;
    a storage medium in communication with the processor; and
    a memory in communication with the processor, the memory to store instructions to execute using the processor, the instructions comprising:
        instructions for determining a risk index associated with a performance of the storage medium;

instructions for adjusting a refresh factor associated with at least a portion of the storage medium in response to determining the risk index; and instructions for performing a data refresh operation on the portion of the storage medium based at least in part on the on the refresh factor.

* * * * *